(12) United States Patent
Zheng et al.

(10) Patent No.: US 10,650,096 B2
(45) Date of Patent: *May 12, 2020

(54) WORD SEGMENTATION METHOD BASED ON ARTIFICIAL INTELLIGENCE, SERVER AND STORAGE MEDIUM

(71) Applicant: BEIJING BAIDU NETCOM SCIENCE AND TECHNOLOGY CO., LTD., Beijing (CN)

(72) Inventors: Liqun Zheng, Beijing (CN); Jinbo Zhan, Beijing (CN); Qiugen Xiao, Beijing (CN); Zhihong Fu, Beijing (CN); Jingzhou He, Beijing (CN); Guyue Zhou, Beijing (CN)

(73) Assignee: BEIJING BAIDU NETCOM SCIENCE AND TECHONLOGY CO., LTD., Beijing (CN)

( * ) Notice: Subject to any disclaimer, the term of this patent is extended or adjusted under 35 U.S.C. 154(b) by 100 days.

This patent is subject to a terminal disclaimer.

(21) Appl. No.: 15/934,410

(22) Filed: Mar. 23, 2018

(65) Prior Publication Data

US 2018/0365217 A1 Dec. 20, 2018

(30) Foreign Application Priority Data

Jun. 14, 2017 (CN) .......................... 2017 1 0448749

(51) Int. Cl.
*G06F 17/27* (2006.01)
*G06F 17/28* (2006.01)

(52) U.S. Cl.
CPC ........ *G06F 17/2775* (2013.01); *G06F 17/274* (2013.01); *G06F 17/277* (2013.01); *G06F 17/2863* (2013.01)

(58) Field of Classification Search
USPC ...................................................... 704/7–10
See application file for complete search history.

(56) References Cited

U.S. PATENT DOCUMENTS 5,822,731 A * 10/1998 Schultz ................. G06F 16/907
704/270.1
5,873,076 A * 2/1999 Barr .................... G06Q 30/0623
707/E17.14

(Continued)

FOREIGN PATENT DOCUMENTS

CN 101118538 2/2008
CN 103678318 3/2014

(Continued)

OTHER PUBLICATIONS

Kong, "The Design and Implementation of Text Classification System Based on VSM," Dissertation for the Master Degree in Engineering, Harbin Institute of Technology, Mar. 2014, 85 pages.

(Continued)

*Primary Examiner* — Leonard Saint Cyr
(74) *Attorney, Agent, or Firm* — Hodgson Russ LLP

(57) ABSTRACT

Embodiments of the present disclosure disclose a word segmentation method based on artificial intelligence, a server and a storage medium. The word segmentation method may include: acquiring a corpus to be segmented and a segmentation model corresponding to a preset segmentation template; matching the corpus to be segmented with the segmentation model according to a preset matching algorithm, and acquiring a target phrase satisfying a first preset rule in the corpus to be segmented; modifying an emission matrix corresponding to the segmentation model and the corpus to be segmented according to the target phrase; and performing a word segmentation on the corpus to be segmented according to the emission matrix modified, to acquire a first segmentation result.

17 Claims, 4 Drawing Sheets

(56) References Cited

U.S. PATENT DOCUMENTS

| | | | |
|---|---|---|---|
| 2014/0012569 A1 | 1/2014 | Sung et al. | |
| 2016/0125439 A1* | 5/2016 | Sheppard | G06Q 30/0204 |
| | | | 705/7.33 |
| 2017/0061291 A1 | 3/2017 | Deselaers et al. | |

FOREIGN PATENT DOCUMENTS

| | | |
|---|---|---|
| CN | 104462758 | 3/2015 |
| CN | 105068999 | 11/2015 |
| CN | 105373529 | 3/2016 |
| CN | 105912524 | 8/2016 |
| CN | 105931271 | 9/2016 |

OTHER PUBLICATIONS

SIPO, First Office Action for CN Application No. 201710448749.6, dated Feb. 3, 2020.

Borkar et al., "Automatic segmentation of text into structured records," ACM SIGMOD, 2001, 12 pages.

Jiang et al., "A Cascaded Linear Model for Joint Chinese Word Segmentation and Part-of-Speech Tagging," Proceedings of ACL-08: HLT, Association for Computational Linguistics, Jun. 2008, pp. 897-904.

Qiao, "Chinese named entity recognition based on rules and statistics," Master Thesis, Shan Dong University, 2007, abstract only.

* cited by examiner

WORD SEGMENTATION METHOD BASED ON ARTIFICIAL INTELLIGENCE, SERVER AND STORAGE MEDIUM

CROSS REFERENCE TO RELATED APPLICATION

This application is based upon and claims a priority to Chinese Patent Application Serial No. 201710448749.6, filed with the Status Intellectual Property Office of P. R. China on Jun. 14, 2017, the entire contents of which are incorporated herein by reference.

FIELD

The present disclosure relates to a word segmentation technology field, and more particularly to a word segmentation method and a word segmentation apparatus based on artificial intelligence, a server and a storage medium.

BACKGROUND

Artificial intelligence (AI for short) is a new technology for studying and developing theories, methods, technologies and application systems for simulating, extending and expanding human intelligence. AI is a branch of computer science, intending to know essence of intelligence and to produce an intelligent machine able to act in a way similar to that of human intelligence. Researches on the AI field refer to robots, speech recognition, image recognition, natural language processing and expert systems etc.

Chinese word segmentation means segmenting a sequence of Chinese characters into separate words. The Chinese word segmentation is a basis of text mining. When the Chinese word segmentation is performed successfully on a text sequence input into a computer, the commuter may recognize a meaning of the text sequence automatically.

At present, a general segmentation model is used as a Chinese segmentation model, leading to an inaccurate word segmentation performed on a text in a professional field or a specific scene. In prior art, an accurate word segmentation on the text in a professional field or a specific scene may be achieved by performing a post-processing on a segmentation result of the general segmentation model, or by re-training the general segmentation model using word segmentation training corpus in the professional field or the specific scene to acquire the segmentation model corresponding to the professional field or the specific scene.

In the above two methods, regarding to the first method, since there may be an overlapping segmented term between two phrases, the segmentation result may be wrong; regarding to the second method, it is time and energy consuming to re-train the segmentation model, and the word segmentation quality is difficult to be ensured.

SUMMARY

Accordingly, embodiments of the present disclosure provide a word segmentation method and a word segmentation apparatus based on artificial intelligence, a server and a storage medium.

In a first aspect, embodiments of the present disclosure provide a word segmentation method based on artificial intelligence. The word segmentation method may include: acquiring a corpus to be segmented and a segmentation model corresponding to a preset segmentation template; matching the corpus to be segmented with the segmentation model according to a preset matching algorithm, and acquiring a target phrase satisfying a first preset rule in the corpus to be segmented; modifying an emission matrix corresponding to the segmentation model and the corpus to be segmented according to the target phrase; and performing a word segmentation on the corpus to be segmented according to the emission matrix modified to acquire a first segmentation result.

In a second aspect, embodiments of the present disclosure provide a word segmentation apparatus based on artificial intelligence. The word segmentation apparatus may include: a model acquiring module, configured to acquire a corpus to be segmented and a segmentation model corresponding to a preset segmentation template; a phrase acquiring module, configured to match the corpus to be segmented with the segmentation model according to a preset matching algorithm, and to acquire a target phrase satisfying a first preset rule in the corpus to be segmented; a matrix modifying module, configured to modify an emission matrix corresponding to the segmentation model and the corpus to be segmented according to the target phrase; and a segmentation processing module, configured to perform a word segmentation on the corpus to be segmented according to the emission matrix modified, so as to acquire a first segmentation result.

In a third aspect, embodiments of the present disclosure provide a server. The server may include one or more processors and a memory configured to store one or more programs, in which, when the one or more programs are executed by the one or more processors, the one or more processors are configured to execute the word segmentation method based on artificial intelligence according to embodiments of the present disclosure.

In a fourth aspect, embodiments of the present disclosure provide a storage medium including computer executable instructions, in which, when the computer executable instructions are executed by a computer processor, the word segmentation method based on artificial intelligence according to embodiments of the present disclosure is performed.

DETAILED DESCRIPTION

Figure 1:
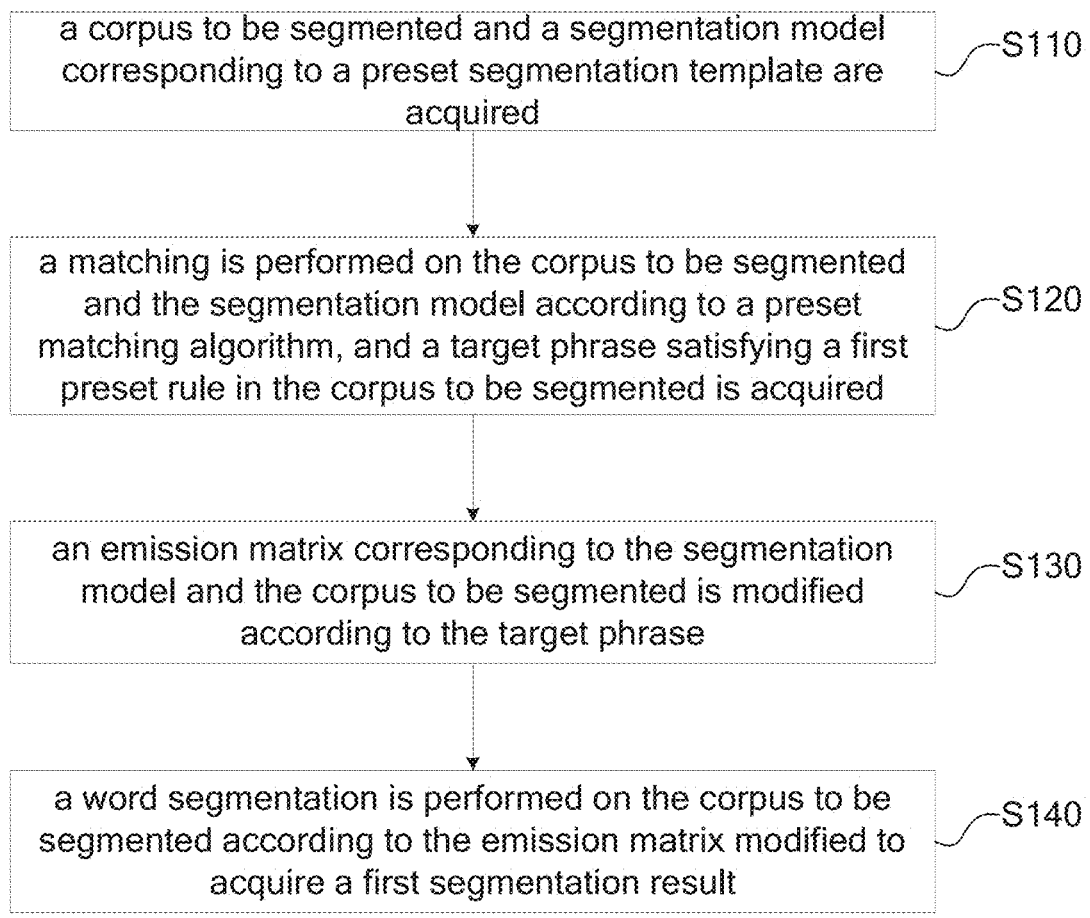
FIG. 1 is a flow chart of a word segmentation method based on artificial intelligence according to a first embodiment of the present disclosure.

For a clear description of objectives, technical solutions and advantageous of the present disclosure, reference will be made in detail to describe embodiments of the present disclosure. It should be noted that, the embodiments described herein with reference to drawings are used to generally explain the present disclosure, rather than limiting the present disclosure.

In addition, it should also be noted that, for convenience of the description, the accompany drawings illustrate parts rather than all contents relative to the present disclosure. Before the exemplary embodiments are described in detail, it should be noted that some exemplary embodiments are described as processing or method in a form of a flow chart. Although the operations (or steps) illustrated in the flow chart are described as a processing in a certain order, some operations can be performed concurrently, concomitantly or simultaneously. In addition, the order of the operations may be re-arranged. When the operations have been accomplished, the processing may be finished. Additional steps or acts which are not illustrated in the drawings may be included. The processing may correspond to a method, a function, a regulation, a subroutine, a subprogram and the like.

First Embodiment

FIG. 1 is a flow chart of a word segmentation method based on artificial intelligence according to the first embodiment of the present disclosure. The method according to this embodiment may be performed by a word segmentation apparatus based on artificial intelligence. The word segmentation apparatus may be realized in a form of hardware/software and integrated in a server providing a word segmentation service. The word segmentation method may include followings.

At block 110, a corpus to be segmented and a segmentation model corresponding to a preset segmentation template are acquired.

In this embodiment, the preset segmentation template refers to a corpus segmented by applying a word segmentation method satisfying a requirement of a professional field or a specific scene.

It should be understood for the skilled in the art that, existing segmentation models are general segmentation models able to acquire precise segmentation results with regard to daily expressions, common phrases and the like. However, it is difficult for the general segmentation models to precisely segment professional phrases in professional fields and special terms to be segmented in some specific scenes. Therefore, in this embodiment, the word segmentation is performed on the corpus to be segmented by using the segmentation model corresponding to the preset segmentation template, such that the segmentation results may be consistent with the preset segmentation template.

In this embodiment, the segmentation model corresponding to the preset segmentation template refers to a segmentation model acquired by modifying a model parameter of the existing segmentation model using the word segmentation method according to the preset segmentation template, in which modifying the model parameter of the segmentation model may be typically realized by an incremental training method and the like.

In this embodiment, the corpus to be segmented may be a speech draft, a thesis or a meeting material and the like, which will not be limited in this embodiment. The method for acquiring the corpus to be segmented may include: inputting the corpus to be segmented by a user directly, or downloading the corpus to be segmented from a corresponding server according to a link address inputted by the user, which will not be limited in this embodiment.

At block 120, a matching is performed on the corpus to be segmented and the segmentation model according to a preset matching algorithm, and a target phrase satisfying a first preset rule in the corpus to be segmented is acquired.

In this embodiment, matching the corpus to be segmented with the segmentation model is to match the corpus to be segmented with the preset segmentation template. As the model parameter of the segmentation model represents all word segmentation methods of the preset segmentation template, matching the corpus to be segmented with the preset segmentation template may be accomplished by matching the corpus to be segmented with the segmentation model.

In this embodiment, the preset matching algorithm may be a forward maximum matching algorithm, a backward maximum matching algorithm or a bidirectional matching algorithm etc., which will not be limited in this embodiment. The first preset rule may refer to a range of the number of Chinese characters included in the target phrase, and particularly, refer to that the number of Chinese characters included in the target phrase is greater than or equal to 4 and the like.

It should be understood for the skilled in the art that, generally, a main difference between the word segmentation method used in a professional field or a specific scene and the common word segmentation method lies in partitioning a phrase including several characters. Therefore, in this embodiment, only the phrase (i.e., the target phrase) matching with the preset segmentation template and satisfying the first preset rule in the corpus to be segmented is acquired, instead of acquiring all phrases matching with the preset segmentation template in the corpus to be segmented.

In a specific example, the preset segmentation template is a biological dictionary, the segmentation model corresponds to the biology dictionary, and the corpus to be segmented is a speech draft related to biological evaluation. The matching is performed on the speech draft and the segmentation model according to the forward maximum matching algorithm, to acquire the phrase in the speech draft which is consistent with a phrase in the biological dictionary and includes four or more characters.

In addition, the first preset rule refers to that the number of Chinese characters included in the target phrase is maximum, in other words, the phrase including the maximum number of Chinese characters is selected from the matching result acquired by matching the corpus to be segmented and the preset segmentation template according to the preset matching algorithm as the target phrase. Generally, phrases may be overlapped with each other, therefore, there may be a problem of word segmentation conflict in the process of the word segmentation. If the first preset rule refers to that the number of Chinese characters included in the target phrase is maximum, when performing the word segmentation on the corpus to be segmented, an optimal sequence may be acquired according to a matrix weight by using Marcov decoding process, such that the conflict problem can be solved.

At block 130, an emission matrix corresponding to the segmentation model and the corpus to be segmented is modified according to the target phrase.

In this embodiment, after the corpus to be segmented and the segmentation model are acquired, the emission matrix corresponding to the segmentation model and the corpus to be segmented may be generated firstly, and then a weight corresponding to the target phrase in the emission matrix may be modified.

Generally, after the word segmentation is performed using the segmentation model corresponding to the preset segmentation template, the acquired segmentation result may be highly consistent with the preset segmentation template. However, there may be a word segmentation error for the phrase including a plurality of characters. Therefore, in this embodiment, the emission matrix is modified according to the target phrase, such that an accuracy of the segmentation result can be improved.

It should be understood for the skilled in the art that, in a process of performing the word segmentation on the sentence to be segmented using the segmentation model, the number of rows of the generated emission matrix is generally four, corresponding respectively to four potential labels of the character (i.e., the head part, the intermediate part, the trailing part and the single word phrase), the number of columns generally equals to the number of Chinese characters included in the sentence to be segmented. In this embodiment, the attribute of the emission matrix is consistent with that described above.

In this embodiment, a specific process of modifying the emission matrix according to the target phrase may include: determining a label of each Chinese character in the target phrase (in other words, for each Chinese character, determining whether the Chinese character is the head part, the intermediate part, the trailing part of the target phrase, or a phrase), and then modifying a weight corresponding to the label of each Chinese character in the emission matrix.

Further, in order to acquire accurate segmentation result, when modifying the weight in the emission matrix, the value modified for each time may not be great, and the value generally equals to one, two or three. However, in this embodiment, in order to perform an accurate word segmentation on the phrase including a plurality of characters, the value modified for each time can be enlarged, for example, the value may be 50, 100 etc.

In a specific example, when the sentence to be segmented is "一心一意做事 (to work dedicatedly and earnestly)", the emission matrix may be represented as:

$$\begin{bmatrix} 8 & 2 & 8 & 5 & 10 & 8 \\ 5 & 5 & 5 & 0 & 0 & 0 \\ 0 & 0 & 0 & 5 & 0 & 5 \\ 0 & 0 & 0 & 0 & 0 & 0 \end{bmatrix}.$$

If "一心一意 (dedicatedly mid earnestly)" is the target phrase, the modified emission matrix is represented as:

$$\begin{bmatrix} 108 & 2 & 8 & 5 & 10 & 8 \\ 5 & 105 & 105 & 0 & 0 & 0 \\ 0 & 0 & 0 & 105 & 0 & 5 \\ 0 & 0 & 0 & 0 & 0 & 0 \end{bmatrix},$$

in other words, the weight of the label corresponding to each Chinese character in the phrase "一心一意" is increased by 100.

At block 140, a word segmentation is performed on the corpus to be segmented according to the emission matrix modified to acquire a first segmentation result.

In this embodiment, after the emission matrix is modified, a transfer matrix corresponding to the segmentation model may be acquired according to the model parameter of the segmentation model, and then the word segmentation may be performed on the corpus to be segmented according to the modified emission matrix and the transfer matrix, such that the first segmentation result is acquired. Specifically, a Markov operation may be performed on the modified emission matrix and the transfer matrix, and the result may be processed using viterbi algorithm, so as to acquire the first segmentation result.

The first embodiment provides a word segmentation method based on artificial intelligence. With the word segmentation method, a corpus to be segmented and a segmentation model corresponding to a preset segmentation template may be acquired firstly, and then the corpus to be segmented is matched with the segmentation model according to a preset matching algorithm. After that, a target phrase satisfying a first preset rule in the corpus to be segmented may be acquired, and an emission matrix corresponding to the segmentation model and the corpus to be segmented may be modified according to the target phrase. Finally, a word segmentation may be performed on the corpus to be segmented according to the emission matrix modified, and a first segmentation result may be acquired. Therefore, technical problems including a tedious process and a low accuracy when a word segmentation is performed on a text in a professional field or a specific scene in prior art can be solved, and a fast, simplified and accurate word segmentation performed on a text in a professional field or a specific scene can be achieved.

Second Embodiment

Figure 2:
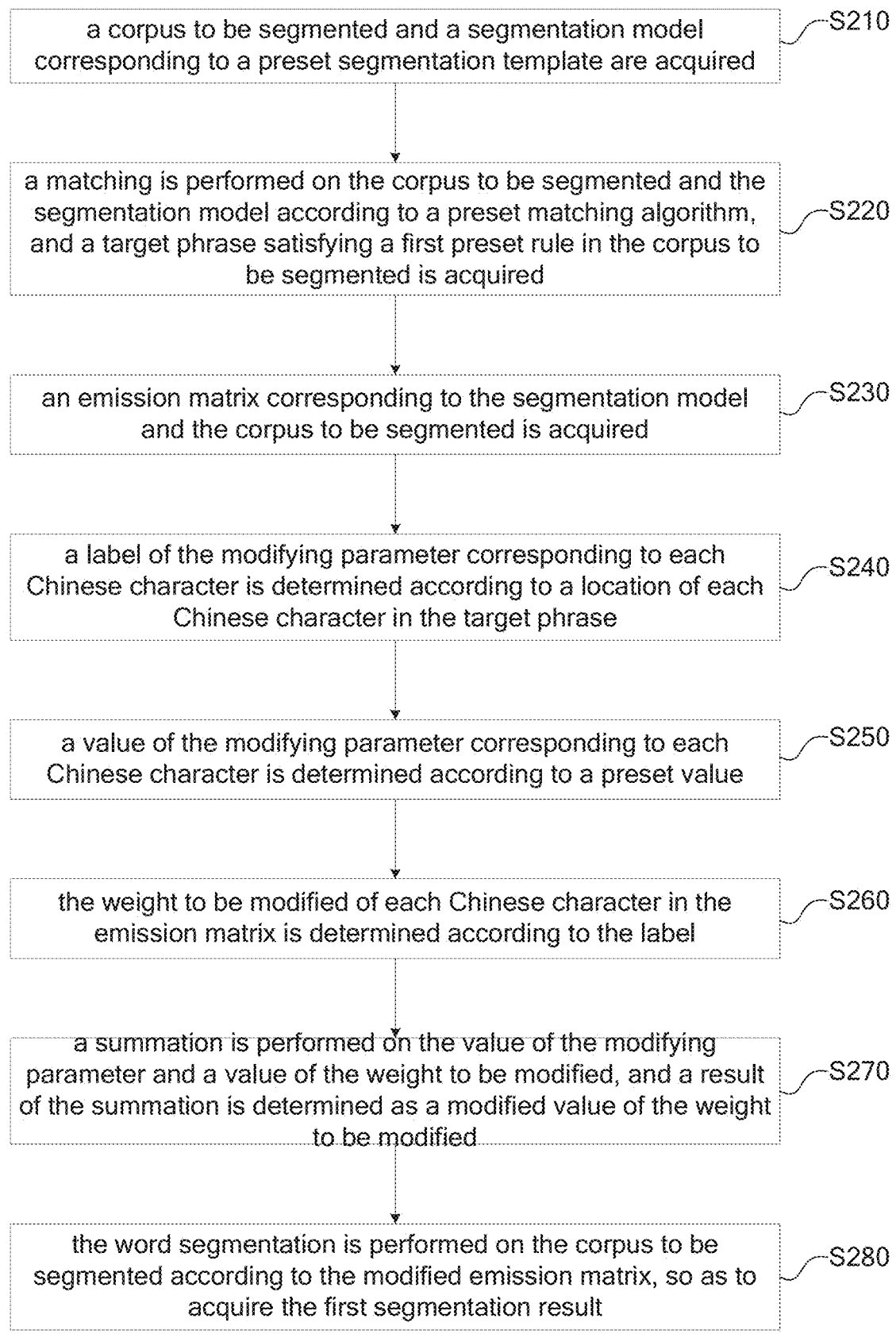
FIG. 2 is a flow chart of a word segmentation method based on artificial intelligence according to a second embodiment of the present disclosure.

FIG. 2 is a flow chart of a word segmentation method based on artificial intelligence according to the second embodiment of the present disclosure. This embodiment is an optimized solution based on the above embodiment. In this embodiment, modifying the emission matrix corresponding to the segmentation model and the corpus to be segmented according to the target phrase may include: acquiring the emission matrix corresponding to the segmentation model and the corpus to be segmented; determining a modifying parameter corresponding to a Chinese character in the target phrase; and modifying a weight corresponding to the Chinese character in the emission matrix according to the modifying parameter.

Further, determining the modifying parameter corresponding to the Chinese character in the target phrase may include: determining a label of the modifying parameter corresponding to the Chinese character according to a location of the Chinese character in the target phrase, in which the label includes a head part, an intermediate part, a trailing part and a single word phrase; and determining a value of the modifying parameter corresponding to the Chinese character according to a preset value.

Further, modifying the weight corresponding to the Chinese character in the emission matrix according to the modifying parameter may include: determining the weight to be modified of the Chinese character in the emission matrix according to the label; and modifying the weight to be modified according to the value of the modifying parameter.

Further, modifying the weight to be modified according to the value of the modifying parameter may include: performing a summation on the value of the modifying parameter and a value of the weight to be modified, and determining a result of the summation as a modified value of the weight to be modified.

Accordingly, the method of this embodiment may include followings.

At block 210, a corpus to be segmented and a segmentation model corresponding to a preset segmentation template are acquired.

At block 220, a matching is performed on the corpus to be segmented and the segmentation model according to a preset matching algorithm, and a target phrase satisfying a first preset rule in the corpus to be segmented is acquired.

At block 230, an emission matrix corresponding to the segmentation model and the corpus to be segmented is acquired.

In this embodiment, the number of rows of the emission matrix is four, corresponding respectively to four potential labels of the character (i.e., the head part, the intermediate part, the trailing part and the single word phrase), and the number of columns equals to the number of Chinese characters included in the sentence (not the whole corpus to be segmented) in the corpus to be segmented.

Generally, in the process of performing the word segmentation on the corpus to be segmented by the segmentation model, the contents are segmented at several times, rather than at a time, such that the amount of data included in the emission matrix may be reduced in the word segmentation process, thereby reducing a space usage of the memory. For example, one or more rows in the corpus to be segmented may be segmented each time.

At block 204, a label of the modifying parameter corresponding to each Chinese character is determined according to a location of each Chinese character in the target phrase.

In this embodiment, the location of the Chinese character in the target phrase refers to the label of the character, including a head part, an intermediate part, a trailing part or a single word phrase. It should be understood that, when a single Chinese character is regarded as a phrase, the location of this Chinese character in the phrase can be regarded as the head part, the intermediate part and the trailing part at the same time. Therefore, the label of "single word phrase" is added for this case.

In this embodiment, the modifying parameter corresponding to the Chinese character refers to data used to modify the weight corresponding to the Chinese character in the emission matrix. The label of the modifying parameter may be the head part, the intermediate part, the trailing part or the single word phrase, which is same as that of the Chinese character to be modified.

At block 250, a value of the modifying parameter corresponding to each Chinese character is determined according to a preset value.

In this embodiment, the preset value may be 50, 80 or 100 etc. The modifying value of the weight should be a large value, such that the word segmentation can be performed accurately on the target phrase.

At block 260, the weight to be modified of each Chinese character in the emission matrix is determined according to the label.

In this embodiment, the weight to be modified of the Chinese character refers to data at the row having the attribute consistent with the label of the Chinese character selected from data in the column corresponding to the Chinese character in the emission matrix.

At block 270, a summation is performed on the value of the modifying parameter and a value of the weight to be modified, and a result of the summation is determined as a modified value of the weight to be modified.

In this embodiment, after the weight to be modified of the Chinese character in the emission matrix is determined, the summation is performed on the value of the modifying parameter and the value of the weight to be modified, and a result of the summation is determined as a modified value of the weight to be modified.

At block 280, the word segmentation is performed on the corpus to be segmented according to the modified emission matrix, so as to acquire the first segmentation result.

The second embodiment of the present disclosure provides a word segmentation method based on artificial intelligence. The method for modifying the emission matrix is described in detail, the weight in the emission matrix and corresponding to the label of each Chinese character in the target phrase is increased dramatically, such that the emission matrix allowing an accurate word segmentation can be acquired. By using this method, the emission matrix including the weight significantly representing a relevance between the Chinese character as well as the phrase including the Chinese character and the preset segmentation model can be acquired. Therefore, the segmentation result is highly consistent with the preset segmentation template, such that the accuracy of word segmentation in a professional field or a specific scene can be improved. In addition, as the segmentation result may be changed by intervening in the weight of the emission matrix, rather than by post-processing the segmentation result, a majority of segmentation boundaries and segmentation results have not been affected, such that a stability of word segmentation can be improved.

Third Embodiment

Figure 3:
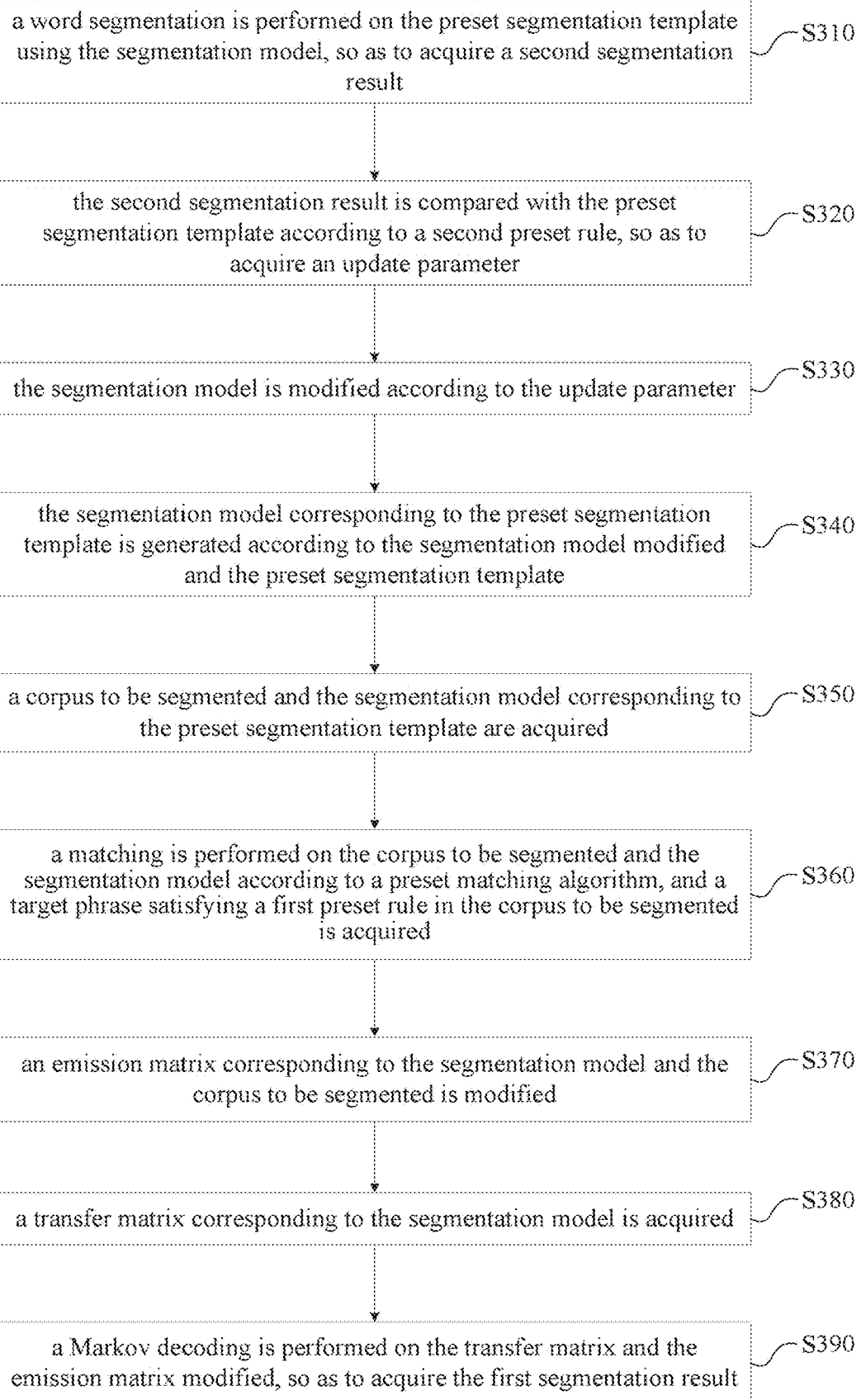
FIG. 3 is a flow chart of a word segmentation method based on artificial intelligence according to a third embodiment of the present disclosure.

FIG. 3 is a flow chart of a word segmentation method based on artificial intelligence according to the third embodiment of the present disclosure. This embodiment is an optimized solution based on the above embodiments. In this embodiment, before the corpus to be segmented and the segmentation model corresponding to the preset segmentation template are acquired, the word segmentation method may also include: performing the word segmentation on the preset segmentation template using an original segmentation model, to acquire a second segmentation result; comparing the second segmentation result with the preset segmentation template according to a second preset rule, to acquire an update parameter; modifying the original segmentation model according to the update parameter to acquire a modified segmentation model; and generating the segmentation model corresponding to the preset segmentation template according to the modified segmentation model and the preset segmentation template.

Further, performing the word segmentation on the corpus to be segmented according to the emission matrix modified, to acquire the first segmentation result may include: acquiring a transfer matrix corresponding to the segmentation model; and performing a Markov decoding on the transfer matrix and the emission matrix modified, to acquire the first segmentation result.

Accordingly, the word segmentation method according to this embodiment may include followings.

At block 310, a word segmentation is performed on the preset segmentation template using a segmentation model, so as to acquire a second segmentation result.

In this embodiment, the method for acquiring segmentation model corresponding to the preset segmentation template may include: performing the word segmentation on the preset segmentation model using the original segmentation model firstly, so as to acquire the second segmentation result.

In this embodiment, the method for performing the word segmentation on the preset segmentation template using the original segmentation model may include: acquiring the emission matrix and the transfer matrix according to the original segmentation model and the preset segmentation template firstly, and then performing a Markov decoding on the emission matrix and the transfer matrix, so as to acquire the second segmentation result.

At block 320; the second segmentation result is compared with the preset segmentation template according to a second preset rule; so as to acquire an update parameter.

In this embodiment, the second preset rule may refer to a stochastic gradient descent algorithm and the like. The update parameter may refer to a value to be modified for the model parameter of the original segmentation model.

At block 330, the segmentation model is modified according to the update parameter.

In this embodiment, after the update parameter is acquired, the model parameter of the original segmentation model may be modified according to the update parameter, such that the original segmentation model may be modified. The modified segmentation model is not only able to realize the word segmentation effect of the original segmentation model, but also able to perform an accurate word segmentation on the phrase in the preset segmentation template.

At block 340, the segmentation model corresponding to the preset segmentation template is generated according to the segmentation model modified and the preset segmentation template.

In this embodiment, the method for generating the segmentation model corresponding to the preset segmentation template may include: combining a weight of the feature of the preset segmentation template with the model parameter of the modified segmentation template without changing their respective values. Therefore, the model parameter of the segmentation model corresponding to the preset segmentation template may be acquired, and the segmentation model corresponding to the preset segmentation template may be acquired according to the model parameter.

The weight of the feature of the preset segmentation template may be acquired at block 310, and when the emission matrix and the transfer matrix are needed to be acquired according to the segmentation model and the preset segmentation template, the weight of the feature of the preset segmentation template is acquired firstly, and then the emission matrix may be generated according to the weight of the feature of the preset segmentation template.

In a specific example, the weight of the feature of the preset segmentation template may be represented by a matrix $$\begin{bmatrix} B1 & B2 \\ B3 & B4 \end{bmatrix},$$

the model parameter of the modified segmentation model may be represented by a matrix $$\begin{bmatrix} A1 & A2 & A3 \\ A4 & A5 & A6 \\ A7 & A8 & A9 \end{bmatrix},$$

such that the model parameter of the segmentation model corresponding to the preset segmentation template is $$\begin{bmatrix} A1 & A2 & A3 \\ A4 & A5 & A6 \\ A7 & A8 & A9 \\ B1 & B2 \\ B3 & B4 \end{bmatrix}.$$

At block 350, a corpus to be segmented and the segmentation model corresponding to the preset segmentation template are acquired.

At block 360, a matching is performed on the corpus to be segmented and the segmentation model corresponding to the preset segmentation template according to a preset matching algorithm, and a target phrase satisfying a first preset rule in the corpus to be segmented is acquired.

At block 370, an emission matrix corresponding to the segmentation model and the corpus to be segmented is modified.

At block 380, a transfer matrix corresponding to the segmentation model is acquired.

In this embodiment, the transfer matrix, acquired according to the model parameter of the segmentation model, is a probability matrix configured to perform the word segmentation on the corpus to be segmented along with the emission matrix. The transfer matrix represents a label transition possibility of each Chinese character and a label possibility of each Chinese character. Specifically, the label transition possibility of the Chinese character represents possibilities that the label of the Chinese character transitions from the head part to the intermediate part, from the intermediate part to the trailing part, from the trailing part to the intermediate part and form the head part to a single word phrase and the like. The label possibility of the Chinese character represents possibilities that the label of the Chinese character is the head part, the intermediate part, the trailing part and the single word phrase.

At block 390, a Markov decoding is performed on the transfer matrix and the emission matrix modified, so as to acquire the first segmentation result.

In this embodiment, performing the Markov decoding on the transfer matrix and the modified emission matrix may include: decoding the emission matrix and the transfer matrix using viterbi algorithm to acquire an optimal sequence of the Chinese characters, such that the first segmentation result is acquired.

The third embodiment provides a word segmentation method based on artificial intelligence. The method for acquiring the segmentation model corresponding to the preset segmentation template is described in detail. A generalization ability of the phrase in the segmentation model consistent with that in the preset segmentation template is improved by using the incremental training method, such that the segmentation model corresponding to the preset segmentation template is acquired rapidly and easily. Meanwhile, the method for acquiring the first segmentation result is described in detail, the segmentation result can be acquired accurately by using Marcov decoding. With this word segmentation method, a general segmentation model satisfying the word segmentation requirement for a professional field or a specific scene can be acquired rapidly by using the incremental training method, instead of using massive training corpuses to re-train the general segmentation model. Moreover, the weight of the emission matrix may be intervened, such that the accuracy of the segmentation result is higher than that of the segmentation result acquired by re-training the segmentation model.

Fourth Embodiment

Figure 4:
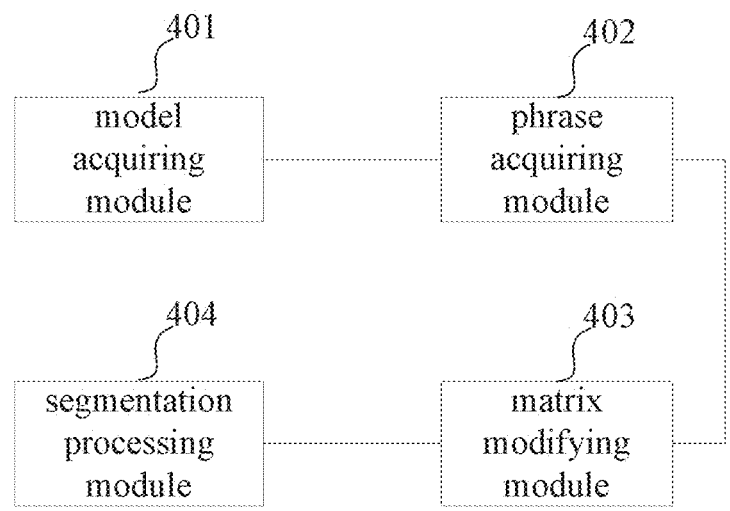
FIG. 4 is a block diagram of a word segmentation apparatus based on artificial intelligence according to a fourth embodiment of the present disclosure.

FIG. 4 is a block diagram of a word segmentation apparatus based on artificial intelligence according to the fourth embodiment of the present disclosure. As shown in FIG. 4, the word segmentation apparatus may include: a model acquiring module 401, a phrase acquiring module 402, a matrix modifying module 403 and a segmentation processing module 404.

The model acquiring module 401 is configured to acquire a corpus to be segmented and a segmentation model corresponding to a preset segmentation template.

The phrase acquiring module 402 is configured to match the corpus to be segmented with the segmentation model according to a preset matching algorithm, and to acquire a target phrase satisfying a first preset rule in the corpus to be segmented.

The matrix modifying module 403 is configured to modify an emission matrix corresponding to the segmentation model and the corpus to be segmented according to the target phrase.

The segmentation processing module 404 is configured to perform a word segmentation on the corpus to be segmented according to the emission matrix modified, so as to acquire a first segmentation result.

The fourth embodiment of the present disclosure provides a word segmentation apparatus based on artificial intelligence. With the word segmentation apparatus, a corpus to be segmented and a segmentation model corresponding to a preset segmentation template may be acquired firstly, and then the corpus to be segmented is matched with the segmentation model according to a preset matching algorithm. After that, a target phrase satisfying a first preset rule in the corpus to be segmented may be acquired, and an emission matrix corresponding to the segmentation model and the corpus to be segmented may be modified according to the target phrase. Finally, a word segmentation may be performed on the corpus to be segmented according to the emission matrix modified, and a first segmentation result may be acquired. Therefore, technical problems including a tedious process and a low accuracy when a word segmentation is performed on a text in a professional field or a specific scene in prior art may be solved, and a fast, simplified and accurate word segmentation performed on a text in a professional field or a specific scene may be achieved.

Based on the above embodiments, the matrix modifying module may include: an emission matrix acquiring unit, configured to acquire the emission matrix corresponding to the segmentation model and the corpus to be segmented; a modifying parameter determining unit, configured to determine a modifying parameter corresponding to a Chinese character in the target phrase; and a weight modifying unit, configured to modify a weight corresponding to the Chinese character in the emission matrix according to the modifying parameter.

Based on the above embodiments, the modifying parameter determining unit may include: a label determining sub-unit, configured to determine a label of the modifying parameter corresponding to the Chinese character according to a location of the Chinese character in the target phrase, in which the label includes a head part, an intermediate part, a trailing part and a single word phrase; and a value determining sub-unit, configured to determine a value of the modifying parameter corresponding to the Chinese character according to a preset value.

Based on the above embodiments, the weight modifying unit may include: a weight to be modified determining sub-unit, configured to determine the weight to be modified of the Chinese character in the emission matrix according to the label; and a weight modifying sub-unit, configured to modify the weight to be modified according to the value of the modifying parameter.

Based on the above embodiments, the weight modifying sub-unit is further configured to perform a summation on the value of the modifying parameter and a value of the weight to be modified, and to determine a result of the summation as a modified value of the weight to be modified.

Based on the above embodiments, the word segmentation apparatus may further include: a second segmentation result acquiring module, configured to perform the word segmentation on the preset segmentation template using an original segmentation model so as to acquire a second segmentation result before the corpus to be segmented and the segmentation model corresponding to the preset segmentation template are acquired; an update parameter acquiring module, configured to compare the second segmentation result with the preset segmentation template according to a second preset rule, so as to acquire an update parameter; a model updating module, configured to modify time original segmentation model according to the update parameter to acquire a modified segmentation model; and a segmentation model generating module, configured to generate the segmentation model corresponding to the preset segmentation template according to the modified segmentation model and the preset segmentation template.

Based on the above embodiments, the segmentation processing module may include: a transfer matrix acquiring unit, configured to acquire a transfer matrix corresponding to the segmentation model; and a first segmentation result acquiring unit, configured to perform a Markov decoding on the transfer matrix and the emission matrix modified, so as to acquire the first segmentation result.

The word segmentation apparatus based on artificial intelligence provided by embodiments of the present disclosure is used to perform any word segmentation method based on artificial intelligence provided by embodiments of the present disclosure. The word segmentation apparatus has functional modules corresponding to the word segmentation method, and is able to realize same advantageous effects.

Fifth Embodiment

Figure 5:
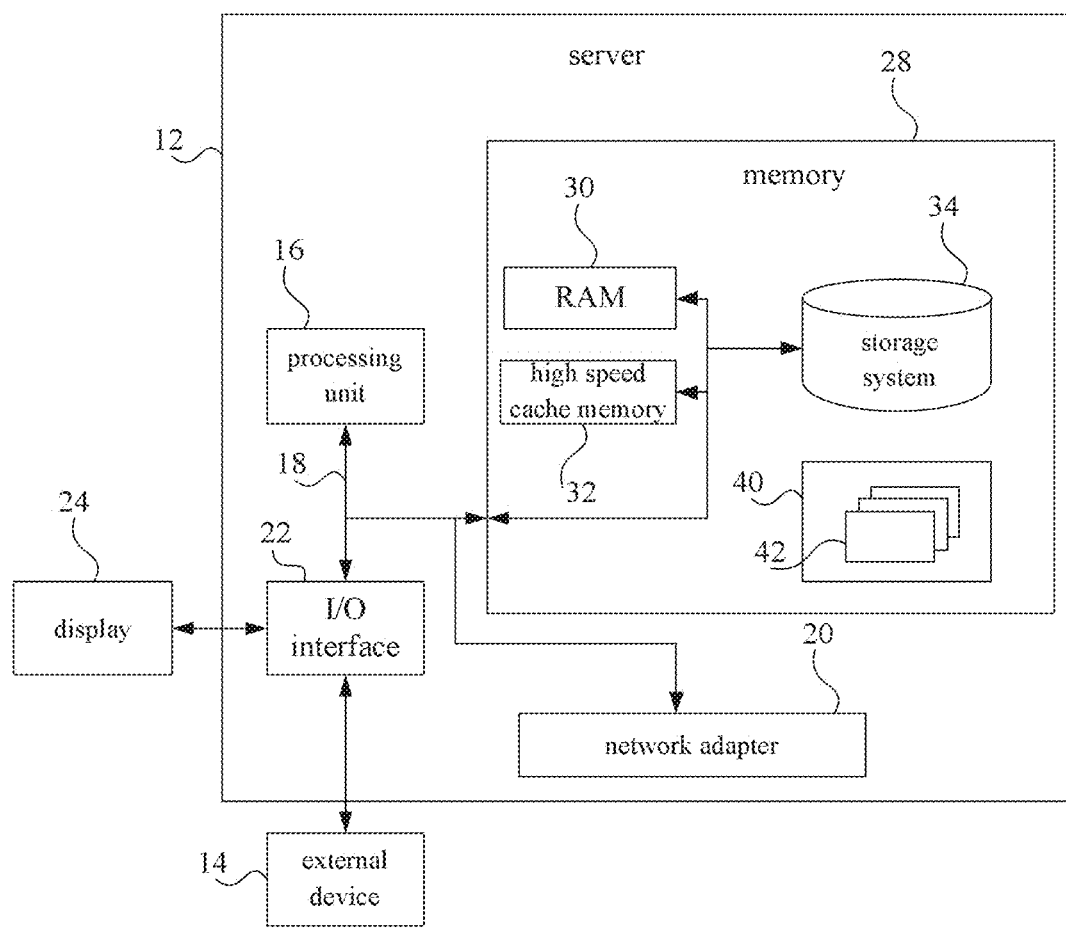
FIG. 5 is a block diagram of a server according to a fifth embodiment of the present disclosure.

FIG. 5 is a block diagram of a server according to the fifth embodiment of the present disclosure. FIG. 5 illustrates a block diagram of an example server 12 suitable for implementing embodiments of the present disclosure. The server 12 illustrated in FIG. 5 is merely an example, which should be not understood to limit the functions and usage scope of embodiments of the present disclosure.

As illustrated in FIG. 5, the server 12 may be represented in a form of a general-purpose computing device. Components of the server 12 may include but are not limited to one or more processors or processing units 16, a system memory 28, a bus 18 connecting various system components including the system memory 28 and the processing units 16.

The bus 18 represents one or more of any of several types of bus structures, including a memory bus or a memory controller, a peripheral bus, an accelerated graphics port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The server 12 typically includes a variety of computer system readable media. These media may be any available media accessible by the server 12 and includes both volatile and non-volatile media, removable and non-removable media.

The system memory 28 may include a computer system readable medium in the form of volatile memory, such as a random access memory (hereinafter referred to as RAM) 30 and/or a high speed cache memory 32. The server 12 may further include other removable or non-removable, volatile or non-volatile computer system storage media. By way of example only, the storage system 34 may be configured to read and write a non-removable and non-volatile magnetic media (not shown in FIG. 5, commonly referred to as a "hard drive"). Although not shown in FIG. 5, a magnetic disk driver for reading from and writing to a removable and non-volatile magnetic disk (such as "floppy disk") and a disk driver for reading from and writing to a removable and non-volatile optical disk (such as compact disk read only memory (hereinafter referred to as CD-ROM), Digital Video Disc Read Only Memory (hereinafter referred to as DVD-ROM) or other optical media can be provided. In these cases, each driver may be connected to the bus 18 via one or more data medium interfaces. The memory 28 may include at least one program product. The program product has a set (such as, at least one) of program modules configured to perform the functions of various embodiments of the present disclosure.

A program/utility 40 having a set (at least one) of the program modules 42 may be stored in, for example, the memory 28. The program modules 42 include but are not limited to, an operating system, one or more application programs, other programs modules, and program data. Each of these examples, or some combination thereof, may include an implementation of a network environment. The program modules 42 generally perform the functions and/or methods in the embodiments described herein.

The server 12 may also communicate with one or more external devices 14 (such as, a keyboard, a pointing device, a display 24, etc.). Furthermore, the server 12 may also communicate with one or more devices enabling a user to interact with the server 12 and/or other devices (such as a network card, modem, etc.) enabling the server 12 to communicate with one or more computer devices. This communication can be performed via the input/output (I/O) interface 22. Also, the server 12 may communicate with one or more networks (such as a local area network (hereafter referred to as LAN), a wide area network (hereafter referred to as WAN) and/or a public network such as an Internet) through a network adapter 20. As shown in FIG. 5, the network adapter 20 communicates with other modules of the server 12 over the bus 18. It should be understood that, although not shown in FIG. 5, other hardware and/or software modules may be used in connection with the server 12: The hardware and/or software includes, but is not limited to, microcode, device drivers, redundant processing units, external disk drive arrays, RAID systems, Drive and data backup storage system.

The processing unit 16 is configured to execute various functional applications and data processing by running programs stored in the system memory 28, for example, implementing the word segmentation method based on artificial intelligence provided in embodiments of the present disclosure. The word segmentation method based on artificial intelligence may include: acquiring a corpus to be segmented and a segmentation model corresponding to a preset segmentation template; matching the corpus to be segmented with the segmentation model according to a preset matching algorithm, and acquiring a target phrase satisfying a first preset rule in the corpus to be segmented; modifying an emission matrix corresponding to the segmentation model and the corpus to be segmented according to the target phrase; and performing a segmentation on the corpus to be segmented according to the emission matrix modified, to acquire a first segmentation result.

Sixth Embodiment

The sixth embodiment of the present disclosure further provides a storage medium including computer executable instructions, in which, when the computer executable instructions are executed by a computer processor, the word segmentation method based on artificial intelligence according to embodiments of the present disclosure is performed. The word segmentation method based on artificial intelligence may include: acquiring a corpus to be segmented and a segmentation model corresponding to a preset segmentation template; matching the corpus to be segmented with the segmentation model according to a preset matching algorithm, and acquiring a target phrase satisfying a first preset rule in the corpus to be segmented; modifying an emission matrix corresponding to the segmentation model and the corpus to be segmented according to the target phrase; and performing a segmentation on the corpus to be segmented according to the emission matrix modified, to acquire a first segmentation result.

Any combination of one or more computer readable medium(s) may be utilized as the computer storage medium according to embodiments of the present disclosure. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. More specific examples (a non-exhaustive list) of the computer readable storage medium include: an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing a program. The program may be used by or in connection with an instruction executed system, apparatus or device.

The computer readable signal medium may include a data signal propagating in baseband or as part of a carrier wave which carries a computer readable program code, Such propagated data signal may take any of a variety of forms, including but not limited to an electromagnetic signal, an optical signal, or any suitable combination thereof. The computer readable signal medium may also be any computer readable medium other than the computer readable storage medium, which may send, propagate, or transport a program used by or in connection with an instruction executed system, apparatus or device.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object oriented programming language, such as Java, Smalltalk, C++, as well as conventional Procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred to as LAN) or a Wide Area Network (hereafter referred to as WAN).

It should be noted that the above descriptions are preferred embodiments and applied technical principles of the present disclosure. It would be appreciated by those skilled in the art that various obvious changes, re-adjustments and replacements can be made in the embodiments without departing from scope of the present disclosure. Therefore, although the present disclosure has been described in detail by above embodiments, the embodiments cannot be construed to limit the present disclosure. Instead, the embodiments of the present disclosure include other equivalents within the spirit and scope of the present disclosure as defined by the claims.

What is claimed is:

1. A word segmentation method based on artificial intelligence, comprising:
    acquiring a corpus to be segmented and a segmentation model corresponding to a preset segmentation template;
    matching the corpus to be segmented with the segmentation model according to a preset matching algorithm, and acquiring a target phrase satisfying a first preset rule in the corpus to be segmented;
    modifying an emission matrix corresponding to the segmentation model and the corpus to be segmented according to the target phrase; and
    performing a word segmentation on the corpus to be segmented according to the emission matrix modified, to acquire a first segmentation result;
    wherein modifying the emission matrix corresponding to the segmentation model and the corpus to be segmented according to the target phrase comprises:
    acquiring the emission matrix corresponding to the segmentation model and the corpus to be segmented;
    determining a modifying parameter corresponding to a Chinese character target phrase; and
    modifying a weight corresponding to the Chinese character in the emission matrix according to the modifying parameter.

2. The word segmentation method according to claim 1, wherein determining the modifying parameter corresponding to the Chinese character in the target phrase comprises:
    determining a label of the modifying parameter corresponding to the Chinese character according to a location of the Chinese character in the target phrase, in which the label comprises a head part, an intermediate part, a trailing part and a single word phrase; and
    determining a value of the modifying parameter corresponding to the Chinese character according to a preset value.

3. The word segmentation method according to claim 2, wherein modifying the weight corresponding to the Chinese character in the emission matrix according to the modifying parameter comprises:
    determining the weight to be modified of the Chinese character in the emission matrix according to the label; and
    modifying the weight to be modified according to the value of the modifying parameter.

4. The word segmentation method according to claim 3, wherein modifying the weight to be modified according to the value of the modifying parameter comprises:
    performing a summation on the value of the modifying parameter and a value of the weight to be modified, and determining a result of the summation as a modified value of the weight to be modified.

5. The word segmentation method according to claim 1, wherein before acquiring the corpus to be segmented and the segmentation model corresponding to the preset segmentation template, the method comprises:
    performing the word segmentation on the preset segmentation template using an original segmentation model, to acquire a second segmentation result;
    comparing the second segmentation result with the preset segmentation template according to a second preset rule, to acquire an update parameter;
    modifying the original segmentation model according to the update parameter to acquire a modified segmentation model; and
    generating the segmentation model corresponding to the preset segmentation template according to the modified segmentation model and the preset segmentation template.

6. The word segmentation method according to claim 1, wherein performing the word segmentation on the corpus to be segmented according to the emission matrix modified, to acquire the first segmentation result comprises:
    acquiring a transfer matrix corresponding to the segmentation model; and
    performing a Markov decoding on the transfer matrix and the emission matrix modified, to acquire the first segmentation result.

7. A server, comprising:
    one or more processors; and
    a memory configured to store one or more programs;
    wherein,
    when the one or more programs are executed by the one or more processors, the one or more processors are configured to execute the word segmentation method based on artificial intelligence, comprising:
    acquiring a corpus to be segmented and a segmentation model corresponding to a preset segmentation template;
    matching the corpus to be segmented with the segmentation model according to a preset matching algorithm, and acquiring a target phrase satisfying a first preset rule in the corpus to be segmented;
    modifying an emission matrix corresponding to the segmentation model and the corpus to be segmented according to the target phrase; and performing a word segmentation on the corpus to be segmented according to the emission matrix modified, to acquire a first segmentation result;
wherein modifying the emission matrix corresponding to the segmentation model and the corpus to be segmented according to the target phrase comprises:
acquiring the emission matrix corresponding to the segmentation model and the corpus to be segmented;
determining a modifying parameter corresponding to a Chinese character in the target phrase; and
modifying a weight corresponding to the Chinese character in the emission matrix according to the modifying parameter.

8. The server according to claim 7, wherein determining the modifying parameter corresponding to the Chinese character in the target phrase comprises:
determining a label of the modifying parameter corresponding to the Chinese character according to a location of the Chinese character in the target phrase, in which the label comprises a head part, an intermediate part, a trailing part and a single word phrase; and
determining a value of the modifying parameter corresponding to the Chinese character according to a preset value.

9. The server according to claim 8, wherein modifying the weight corresponding to the Chinese character in the emission matrix according to the modifying parameter comprises:
determining the weight to be modified of the Chinese character in the emission matrix according to the label; and
modifying the weight to be modified according to the value of the modifying parameter.

10. The server according to claim 9, wherein modifying the weight to be modified according to the value of the modifying parameter comprises:
performing a summation on the value of the modifying parameter and a value of the weight to be modified, and determining a result of the summation as a modified value of the weight to be modified.

11. The server according to claim 7, wherein before acquiring the corpus to be segmented and the segmentation model corresponding to the preset segmentation template, the method comprises:
performing the word segmentation on the preset segmentation template using an original segmentation model, to acquire a second segmentation result;
comparing the second segmentation result with the preset segmentation template according to a second preset rule, to acquire an update parameter;
modifying the original segmentation model according to the update parameter to acquire a modified segmentation model; and
generating the segmentation model corresponding to the preset segmentation template according to the modified segmentation model and the preset segmentation template.

12. The server according to claim 7, wherein performing the word segmentation on the corpus to be segmented according to the emission matrix modified, to acquire the first segmentation result comprises:
acquiring a transfer matrix corresponding to the segmentation model; and
performing a Markov decoding on the transfer matrix and the emission matrix modified, to acquire the first segmentation result.

13. A non-transitory storage medium comprising computer executable instructions, wherein when the computer executable instructions are executed by a computer processor, the word segmentation method based on artificial intelligence, comprising:
acquiring a corpus to be segmented and a segmentation model corresponding to a preset segmentation template;
matching the corpus to be segmented with the segmentation model according to a preset matching algorithm, and acquiring a target phrase satisfying a first preset rule in the corpus to be segmented;
modifying an emission matrix corresponding to the segmentation model and the corpus to be segmented according to the target phrase; and
performing a word segmentation on the corpus to be segmented according to the emission matrix modified, to acquire a first segmentation result;
wherein modifying the emission matrix corresponding to the segmentation model and the corpus to be segmented according to the target phrase comprises:
acquiring the emission matrix corresponding to the segmentation model and the corpus to be segmented;
determining a modifying parameter corresponding to a Chinese character in the target phrase; and
modifying a weight corresponding to the Chinese character in the emission matrix according to the modifying parameter.

14. The non-transitory storage medium according to claim 13, wherein determining the modifying parameter corresponding to the Chinese character in the target phrase comprises:
determining a label of the modifying parameter corresponding to the Chinese character according to a location of the Chinese character in the target phrase, in which the label comprises a head part, an intermediate part, a trailing part and a single word phrase; and
determining a value of the modifying parameter corresponding to the Chinese character according to a preset value.

15. The non-transitory storage medium according to claim 14, wherein modifying the weight corresponding to the Chinese character in the emission matrix according to the modifying parameter comprises:
determining the weight to be modified of the Chinese character in the emission matrix according to the label; and
modifying the weight to be modified according to the value of the modifying parameter.

16. The non-transitory storage medium according to claim 15, wherein modifying the weight to be modified according to the value of the modifying parameter comprises:
performing a summation on the value of the modifying parameter and a value of the weight to be modified, and determining a result of the summation as a modified value of the weight to be modified.

17. The non-transitory storage medium according to claim 13, wherein before acquiring the corpus to be segmented and the segmentation model corresponding to the preset segmentation template, the method comprises:
performing the word segmentation on the preset segmentation template using an original segmentation model, to acquire a second segmentation result;
comparing the second segmentation result with the preset segmentation template according to a second preset rule, to acquire an update parameter;

modifying the original segmentation model according to the update parameter to acquire a modified segmentation model; and generating the segmentation model corresponding to the preset segmentation template according to the modified segmentation model and the preset segmentation template.

* * * * *

UNITED STATES PATENT AND TRADEMARK OFFICE
CERTIFICATE OF CORRECTION

PATENT NO. : 10,650,096 B2
APPLICATION NO. : 15/934410
DATED : May 12, 2020
INVENTOR(S) : Zheng et al.

Page 1 of 1

It is certified that error appears in the above-identified patent and that said Letters Patent is hereby corrected as shown below:

On the Title Page

Item (73), the Assignee should read:
--(73) Assignee: BEIJING BAIDU NETCOM
SCIENCE AND TECHNOLOGY
CO., LTD., Beijing (CN)--

Signed and Sealed this
Fifteenth Day of September, 2020

Andrei Iancu
*Director of the United States Patent and Trademark Office*